United States Patent Office 3,018,690
Patented Jan. 30, 1962

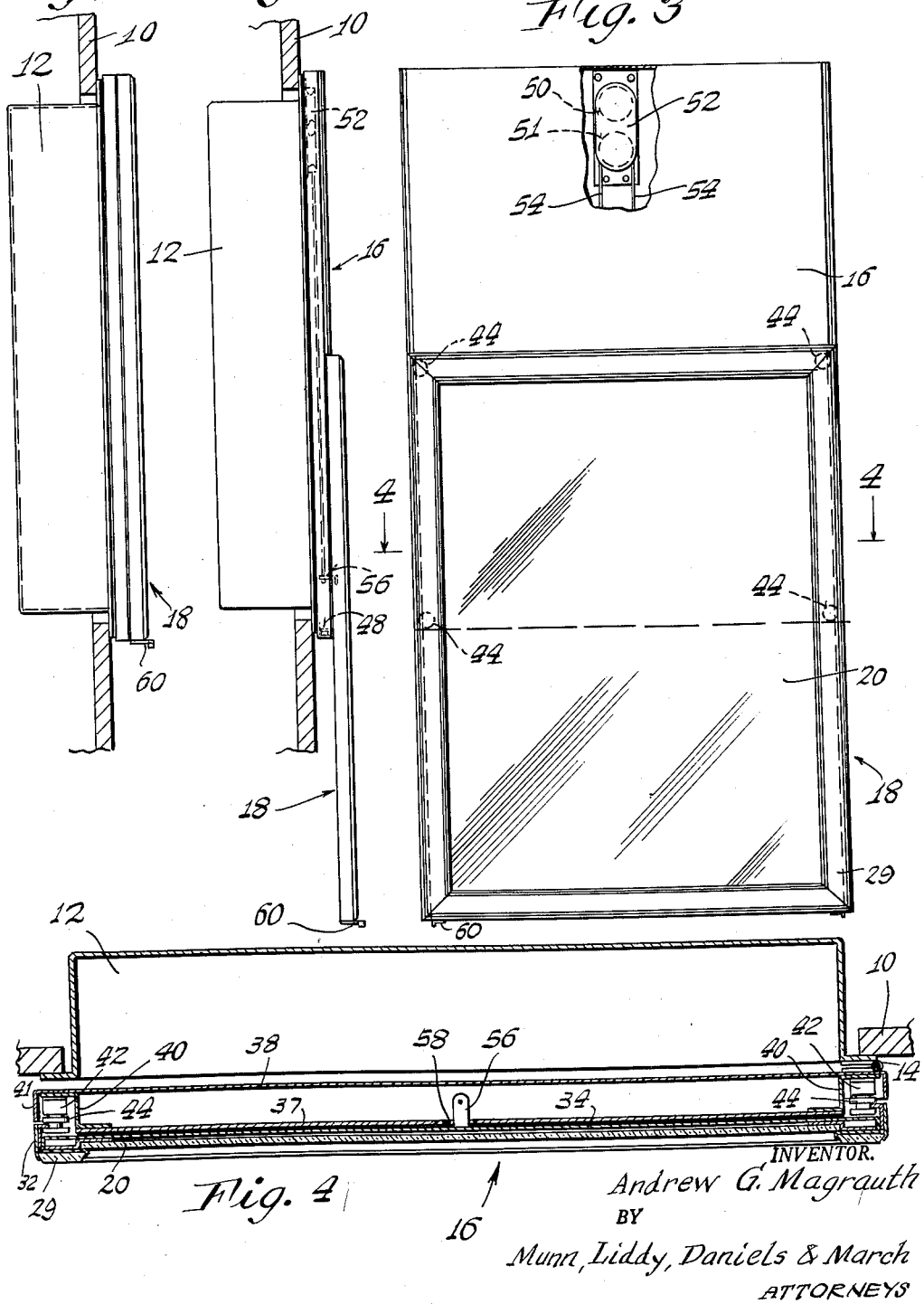

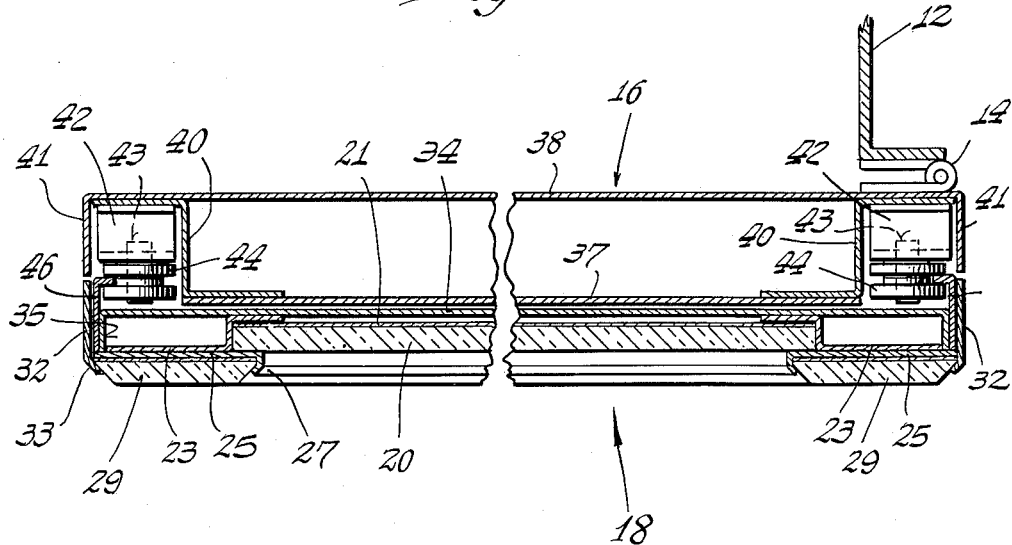

3,018,690
MIRROR FOR CHEST DOOR, WALL, OR SIMILAR USE
Andrew G. Magrauth, Fox Run Road, New Canaan, Conn.
Filed Mar. 27, 1959, Ser. No. 802,423
5 Claims. (Cl. 88—97)

This invention relates to looking glasses or mirrors, and more particularly to articles of this type which are intended to be mounted on wall structures, cabinet or chest doors or the like.

An object of the present invention is to provide a novel and improved mirror construction for wall or similar mounting, wherein the mirror may be easily and quickly vertically adjusted to suit the individual heights or needs of various persons, and readily returned to its original, normal position after each time of use.

Another object of the invention is to provide a novel and improved combination hinged medicine or other cabinet door and mirror front panel therefor, wherein the mirror panel may be readily adjustably shifted vertically to suit the requirements of different individual users, and may be quickly returned to its original position each time after use.

A further object of the invention is to provide an improved verticaly movable mirror construction as above set forth, which is shiftable or adjustable with the expenditure of but very little effort, and is further characterized by a smooth and easy adjusting action.

An additional object of the invention is to provide an improved vertically adjustable mirror construction as above set forth, wherein the mirror will readily remain in the various positions in which it is placed.

A feature of the invention resides in the provision of an improved vertically adjustable mirror structure as characterized, which is extremely compact in its construction and requires relatively little space on the wall, cabinet door or other supporting surface.

An additional feature of the invention resides in the provision of an improved vertically adjustable mirror construction of the type outlined, which is strong and sturdy, and wherein the mirror panel is securely held against unintentional dislodgement.

Yet another object of the invention is to provide an improved vertically adjustable mirror construction having all of the above advantages and which is nevertheless simple in its construction and economical to fabricate and produce.

Other features and advantages will hereinafter appear.

In the drawings accompanying this specification, similar characters of reference have been used to designate like components or portions throughout the several views, in which:

FIGURE 1 is a side elevational view of the present improved mirror construction mounted on a wall chest or medicine cabinet, the mirror panel being shown in its normal raised position wherein it is in registration with the front closure or door of the cabinet.

FIG. 2 is a view like FIG. 1, but showing the mirror panel in its lower-most adjusted position.

FIG. 3 is a front elevational view of the mirror and cabinet construction of FIGS. 1 and 2, with the mirror panel lowered as seen in FIG. 2.

FIG. 4 is a horizontal sectional view, taken on the line 4—4 of FIG. 3.

FIG. 5 is a horizontal fragmentary sectional view of the front door and mirror panel construction, shown on an enlarged scale as compared with FIG. 4, to better illustrate details of construction.

Referring first to FIGS. 1 through 4 there is illustrated a supporting wall structure 10 such as may be provided at the interior of a building, said wall structure carrying a chest or cabinet 12 of the type commonly referred to as a "medicine chest." Cabinets or chests of this kind and also vanity cabinets are commonly provided with hingedly mounted front panels or doors on which a mirror is fixedly secured, this arrangement serving the double purpose of furnishing a wall mirror and at the same time a hinged closure for the cabinet or chest.

In accordance with the present invention there is provided in conjunction with the cabinet or chest 12 a novel and improved, vertically shiftable or adjustable mirror construction which is adapted to be secured to the door or closure panel of the cabinet or chets such mirror construction also being adapted for securement to a supporting wall, to the end that the mirror panel to be easily and quickly placed or positioned at different heights or levels to accommodate the individual requirements of both tall and short persons or persons who may be either standing up or else sitting down. The present improved vertically adjustable mirror construction is intended for use either in conjunction with a cabinet or chest door as illustrated herein, or else apart from any closure means or door as by mounting it directly on a wall surface of the room.

Referring to FIGS. 3 and 4, the cabinet body 12 is shown as having hinge means 14 by which there is pivotally mounted on the body a door or panelled closure designated generally by the numeral 16. By this invention, in conjunction with such hinged panelled closure there is provided a mirror construction designated generally by the numeral 18, which is readily vertically adjustable on the door to different heights or levels located below a normal raised position wherein it is in registration with the door structure 16 as seen in FIG. 1. FIGS. 2 and 3 show the mirror structure 18 lowered on the door 16 to the fullest extent, whereby the upper half (roughly) of the mirror construction 18 is disposed in front of the lower half (roughly) of the door structure 16. Various intermediate positions of the mirror structure may be had, thereby to enable the mirror to be used by both tall and short persons, whether these are standing or sitting down. The door structure 16 is also hereinafter referred to as a "base structure," and may have other forms, as for example to adapt it for mounting directly to the wall of a room.

Referring to FIGS. 4 and 5, the mirror structure 18 is seen to comprise a mirror panel 20 having a usual type of reflecting backing 21, the said panel being carried in a frame or holding device comprising Z-section side members 23 and similar bottom and top frame members secured together in a rectangular assemblage.

The mirror holding device may further comprise front retaining plates 25 extending along the opposite sides and top and bottom of the mirror panel 20 and overlying the marginal portions thereof, to retain the said panel in the frame constituted by the Z-section members 23.

The front retainer plates 25 preferably have bevelled forwardly extending flanges 27 constituting retainers for marginal mirror strips 29 arranged as a border for the central mirror panel 20, and the holding device for the central panel 20 may further comprise a peripheral frame 32 having a bevelled front edge 33 engaged with the marginal mirror strips 29 to complete the mounting of the latter.

The mirror holding device preferably further includes a large panel-like backing or frame member 34 having forwardly extending marginal flanges 35, said frame member engaging and supporting the Z-section frame members 23 as clearly seen in FIG. 5.

By this construction a strong and sturdy holding means is provided, not only for the central mirror panel 20 but also for the marginal mirror strips 29.

The door structure 16 may comprise spaced front and rear panels 37 and 38, the said panels being secured together by marginal Z-section frame members 40 as also seen in FIG. 5, the said members 40 in conjunction with forwardly extending marginal flanges 41 on the rear door panel 38 forming channel-like structures along the side marginal portions of the door structure.

By the present invention, the mirror structure 18 is slidably carried by the door structure 16 so as to be easily and quickly vertically adjustable whereby it may be placed at different heights to suit various conditions of use. I provide an extremely simple yet effective and reliable, cooperable slide means on the door or base structure and holding device, for effecting such adjustable mounting of the latter and the mirror 20. As seen in FIGS. 3, 4 and 5, in the channel-like marginal portions of the door structure 16 I provide a plurality of mounting brackets 42, carrying stub shafts 43 on which rollers 44 are turnably mounted. The rollers 44 may be retained on the shafts 43 in any suitable manner, as by the provision of heads on the shafts, snap-rings or equivalent devices. The rollers 44 have deeply grooved peripheries, and accommodated by the grooves on the rollers are vertically extending L-section rails 46, which are rigidly secured to the side marginal portions of the holding device for the mirror. As seen in FIG. 5, the rails 46 may have relatively wide anchorage or base portions which are disposed perpendicular to the plane of the mirror 20 and which may be secured to the forwardly extending flanges 35 of the holding device panel 34. The side rails 46 have relatively narrow roller-engaging portions which are received in the grooves of the rollers 44, as clearly seen in FIG. 5, thereby to provide an advantageous anti-friction type vertical slide means by which the mirror structure 18 is mounted on the door or base structure 16 for edgewise movement. Preferably, as seen in FIG. 3, four of the rollers 44 are provided, two being located at the two lower corners of the door structure 16 and the remaining two being located approximately halfway up on the door structure at the side marginal portions thereof, so that the rollers may be properly engaged with the vertical rails 46.

By virtue of the grooved construction of the rollers 44 the rails 46 will be held captive by the rollers unless they leave the latter at the ends of the movement of the mirror structure 18. Suitable stops are provided to prevent such separation of the rails 46 from the rollers 44, one such stop comprising a bent arm 48, FIG. 2, carried by the mirror structure 18 and having a yieldable bumper arranged to engage the inside of the lower frame member of the door or base structure 16.

Further, in accordance with the invention, novel means are provided, engaged with the said base or door structure 16 and the holding device of the mirror structure 18, for counteracting the weight of the latter whereby the mirror structure will remain at any elevation in which it is placed. This means comprises a plurality of spring-biased rollers or pulleys 50, 51 carried by a suitable bracket or holder 52 which is mounted in the door or base structure 16 between the front and rear panels 37, 38 thereof. Passing around and secured to each of the spring-charged pulleys 50, 51 is a separate lift cord 54, said cords being disposed in spaced relation at the opposite edges of the lower pulley as shown and extending downward with a slight convergence, being secured at a single point on a rearwardly extending finger or arm 56 which is carried by the rear panel 34 of the holding device and which extends through a vertical slot 58 in the front panel 37 of the door or base structure 16. It will be understood that the spring bias of the pulley 50 is opposite to that of the pulley 51, one cord 54 being attached to the pulley 50 and the other cord 54 to the pulley 51 whereby both pulleys and their associated lifting cords 54 act upward on the holding device or mirror structure 18. Thus, the weight of the said holding device and mirror panel is effectively counteracted by the biased rollers 50, 51, enabling the mirror structure to remain in any vertical position in which it is placed. The spring biased rollers or pulleys 50, 51 may be of the adjustable tension type used in window balance devices as manufactured by Duplex, Incorporated, Los Angeles, California. Details of such window balance rollers or pulleys are given, for example, in Patent No. 2,304,176.

For the purpose of enabling the mirror structure 18 to be readily lowered or raised without resulting in finger marks being made on the mirror panel or marginal mirror strips, small handle pieces 60 are provided on the lower portion of the mirror holding device, said handle pieces extending forwardly and providing a convenient finger-engageable means for shifting the mirror.

From the foregoing it will be understood that I have provided a novel and improved combination mirror-holding device and base structure, either in conjunction with a cabinet or chest or separate therefrom and adapted for wall mounting, by which a mirror or looking-glass panel may be readily lowered or shifted from a normal raised position and placed at different levels to suit individual requirements or various conditions of use. By virtue of the provision of the anti-friction rollers 44 in conjunction with the tracks or rails 46, together with the counterbalancing biased rollers 50, 51 a very easy and smooth operation is had at all times when lowering or raising the mirror structure. Moreover, the mirror will remain in any position in which it is placed, and the entire organization is seen to be extremely compact and to require relatively little space whereby it may be advantageously employed as a door assembly for a medicine or vanity cabinet or chest. Moreover, where the base structure 16 is secured directly and rigidly to a wall structure, the mirror assemblage 18 may be lowered to different levels from its original or normal position registering with the base structure, to suit individual needs and requirements. The various structures involved are seen to be simple and economical to fabricate and produce, while at the same time the organization is sturdy in its construction and reliable in operation.

Variations and modifications may be made within the scope of the claims, and portion of the improvements may be used without others.

I claim:

1. A vertically movable mirror construction for accommodating the individual requirements of either a short or tall person comprising a base structure adapted to be supported on a vertical supporting wall, a holding device having opposed upright edge portions, a mirror carried by said holding device, cooperating slide means on said holding device and base structure for providing edgewise movement of said holding device and mirror carried thereby relative to said base structure so that said mirror can be lowered a substantial distance below the lower portion of said base structure and raised accordingly, said cooperating slide means including a rail having an inturned flange connected to each opposed upright edge portions of said holding device, a plurality of vertically spaced guide rollers rotatably connected to said base structure opposite each edge portion of said holding device, each of said rollers having a circumferentially extending groove formed about the respective peripheries thereof, said rollers being disposed with respect to said rails so that the inturned flanges of said rails are received in the grooves of the adjacent rollers to provide a frictionless slide, and means for counterbalancing the weight of said holding device and mirror carried thereby to facilitate the raising and lowering of said holding device and for maintaining the same in any disposed position thereof.

2. A vertically movable mirror construction for accommodating the individual requirements of either a short or tall person comprising a cabinet having an open front, and a door means including a base structure adapted to be pivotally connected to said cabinet for swinging about a vertical axis, a holding device having opposed vertical edge portions, a mirror carried in said holding device, cooperating slide means interconnecting said holding device and base structure and for providing edgewise movement of said holding device and mirror carried thereby relative to said base structure so that said mirror can be lowered below the lower portion of said base structure and raised accordingly, said cooperating slide means including a rail having an inturned flange connected to each opposed vertical edge portion of said holding device, a plurality of vertically spaced guide rollers rotatably connected to said base structure opposite each edge portion of said holding device, each of said rollers having a circumferentially extending groove formed about the respective peripheries thereof, and said rollers being disposed with respect to said rails so that the inturned flanges of said rails are received in the grooves of the adjacent rollers to provide a frictionless slide and means for counterbalancing the weight of said holding device and mirror carried thereby to facilitate the raising and lowering of said holding device and for maintaining the same in any disposed position thereof.

3. A vertically movable mirror construction for accommodating the individual requirements of either a short or tall person, whether standing or sitting comprising a base structure including a front and rear panel adapted to be supported on a vertical supporting surface, vertically disposed and opposed spacing members for connecting said front and rear panels in spaced relationship, said rear panel terminating in forwardly extending flanges which define with said adjacent spacing members a vertically disposed channel, a plurality of rollers spaced in vertical alignment disposed in each of said channels, means for connecting each of said rollers in said channels so that said rollers are rendered freely rotatable about a respective axis disposed normal to said rear panel, a circumferentially extending groove formed in the periphery of the respective rollers, a holding device including a backing member substantially equal in size to the rear panel of said base structure, said backing member having forwardly extending side flanges, a marginal frame connected to the marginal portions of said backing members, a mirror disposed within said marginal frame, retaining plates connected to said frame and having marginal portions thereof overlying said mirror to secure the same within said frame, a rail connected to each forwardly extending flange of said backing member, said rails extending rearwardly thereof into the channel of said base structure, said rails having an inturned flange adapted to extend into the grooves of the aligned rollers disposed in said channel whereby said rails and engaging rollers form a cooperating frictionless slide for providing edgewise movement of said holding device and mirror carried thereby with respect to said base structure whereby said mirror can be lowered below the lower portion of said base structure and raised accordingly, and means for counterbalancing the weight of said holding device and mirror carried thereby to facilitate raising and lowering said holding device and for maintaining the same in any position thereof.

4. The invention as defined in claim 3, wherein one of the aligned rollers in each of said channels is disposed intermediate the height of said channel, and another of said aligned rollers disposed adjacent the bottom end of said channel.

5. A vertically movable mirror construction for accommodating the individual requirements of either a short or tall person whether standing or sitting comprising a base structure including a front and rear panel, vertically disposed opposed Z-shaped members for connecting said front and rear panels in spaced relationship, said rear panel terminating in forwardly extending flanges which define with said adjacent Z-shaped members a vertically disposed channel, a plurality of rollers spaced in vertical alignment disposed in each of said channels, means for connecting each of said rollers in said channels so that said rollers are rendered freely rotatable about a respective axis disposed normal to said rear panel, a circumferentially extending groove formed in the periphery of the respective rollers, a holding device including a backing member substantially equal in size to the rear panel of said base structure, said backing member having forwardly extending end flanges, a Z-shaped marginal frame connected to the marginal portions of said backing members, a mirror disposed within said marginal frame, retaining plates connected to said frame, said retaining plates having marginal portions thereof overlying said mirror to secure the same within said frame, a rail connected to each forwardly extending flange of said backing member, said rails extending rearwardly thereof into the channel of said base structure and having an inturned flange adapted to extend into the grooves of the aligned rollers disposed in said channels, said rails and engaging rollers forming a cooperating frictionless slide for providing edgewise movement of said holding device and mirror carried thereby relative to said base structure whereby said mirror can be lowered below the lower portion of said base structure and raised accordingly, and means for counterbalancing the weight of said holding device and mirror carried thereby to facilitate raising and lowering said holding device and for maintaining the same in any position thereof.

References Cited in the file of this patent

UNITED STATES PATENTS

| | | |
|---|---|---|
| 314,771 | Abbott | Mar. 31, 1885 |
| 787,243 | Warren | Apr. 11, 1905 |
| 2,199,731 | Pryne | May 7, 1940 |
| 2,770,515 | La Barre | Nov. 13, 1956 |
| 2,773,728 | La Barre | Dec. 11, 1956 |
| 2,780,960 | Miller | Feb. 12, 1957 |
| 2,845,846 | Kelleher | Aug. 5, 1958 |